Dec. 7, 1948.  E. M. DONS ET AL  2,455,658
PIPE COUPLING

Filed Sept. 17, 1945  3 Sheets-Sheet 1

INVENTORS
E. M. DONS
J. V. STEVENS
BY McCauley & McCauley
ATTORNEYS

Dec. 7, 1948.　　　　E. M. DONS ET AL　　　　2,455,658
PIPE COUPLING
Filed Sept. 17, 1945　　　　　　　　　　3 Sheets-Sheet 2
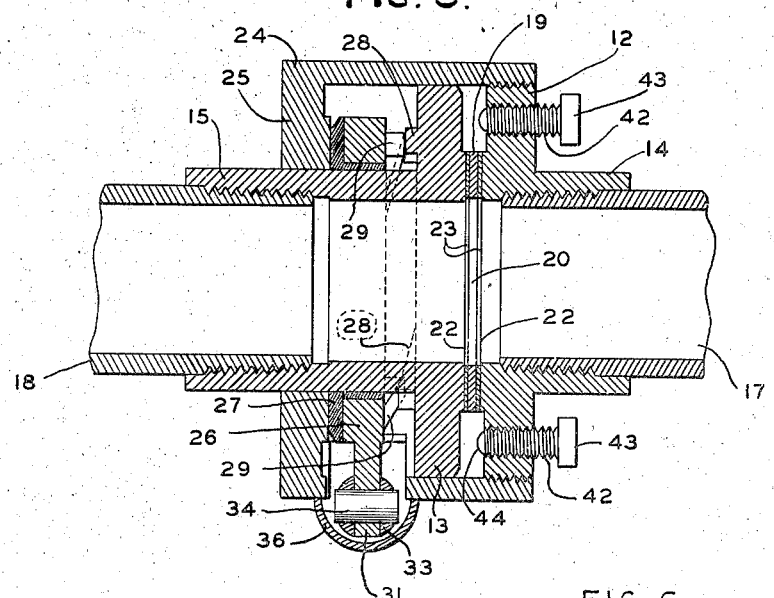
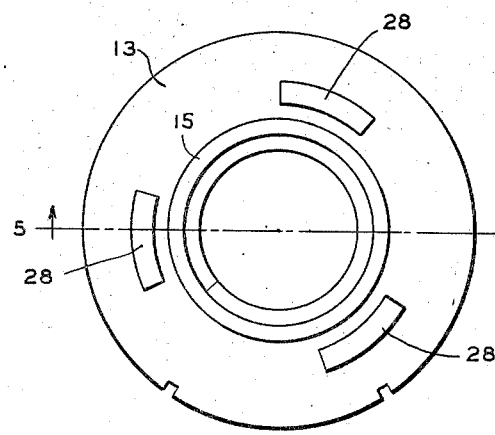
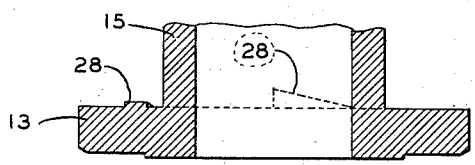
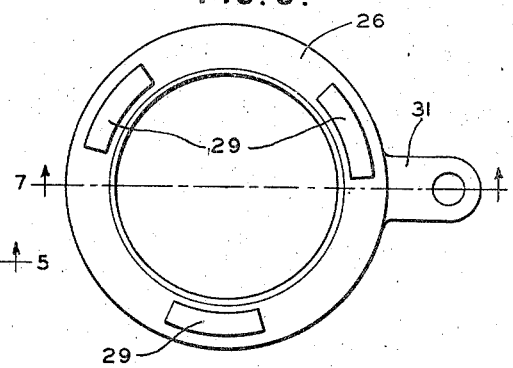
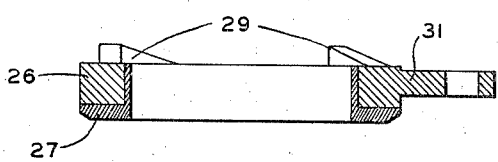
INVENTORS
E. M. DONS
J. V. STEVENS
BY McCauley & McCauley
ATTORNEYS

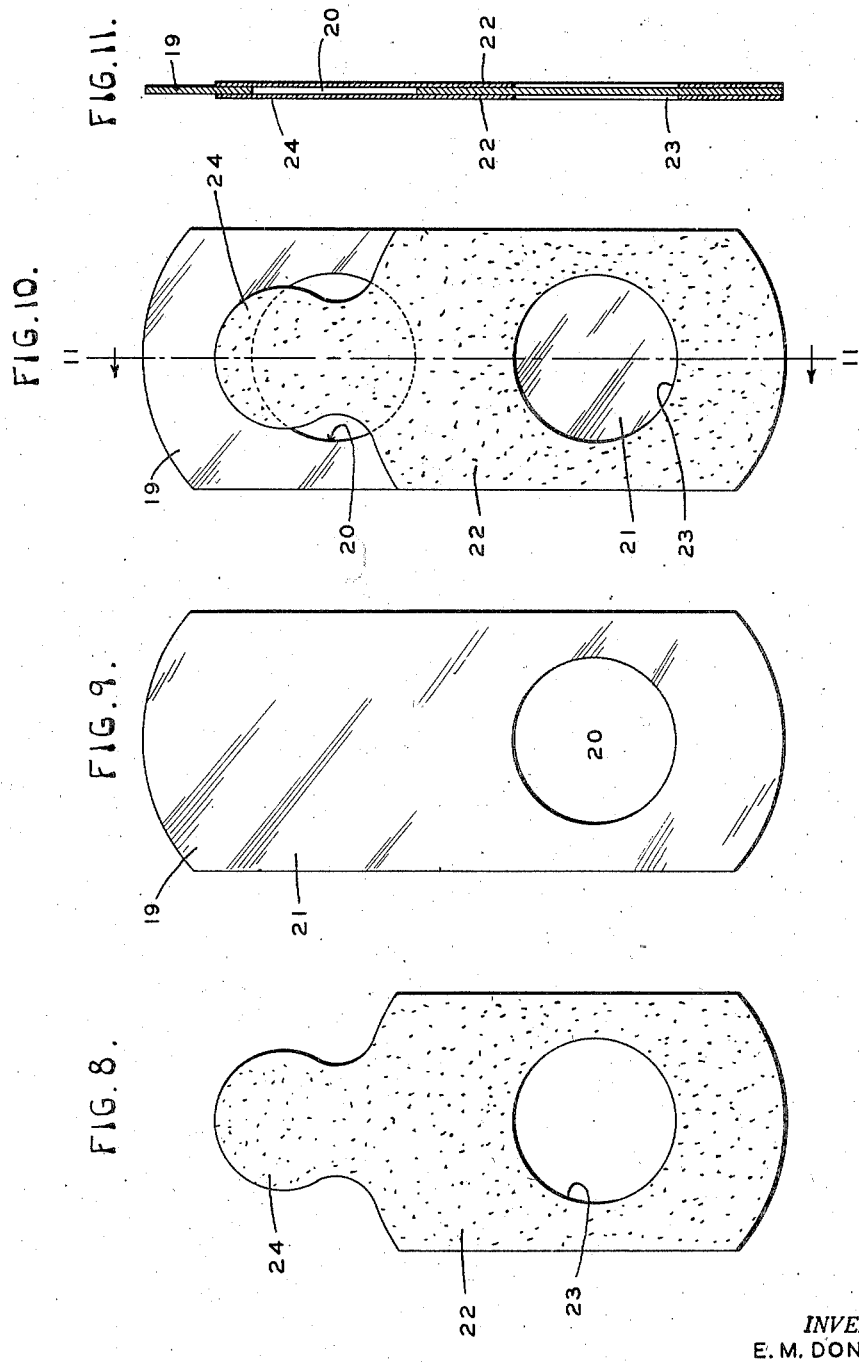

Patented Dec. 7, 1948

2,455,658

UNITED STATES PATENT OFFICE 2,455,658

PIPE COUPLING

Eddie M. Dons, Tulsa, and Jesse V. Stevens, Oakhurst, Okla.

Application September 17, 1945, Serial No. 616,744

8 Claims. (Cl. 251—167)

This invention relates to pipe couplings, and more particularly to a coupling device having special advantages when it becomes necessary to quickly close communication between two connected pipes.

Prior to this invention, ordinary flanges have been commonly employed to connect the ends of adjacent pipes. A series of bolts usually extends through the flanges to tighten a gasket between the flanges. It is quite old to release the series of bolts and insert a "blind" closure member between said flanges, so as to close communication between the connected pipes.

However, this ordinary practice is a very slow procedure involving gradual release of successive nuts equally spaced around the circular flanges, and in some cases the pipes lie below the surface of the ground, where the nuts are not positioned to receive a wrench. In other cases, even where all of the nuts are exposed, there is an unexpected demand for immediate closing of a connection between two pipes.

An object of the present invention is to avoid delay in closing a coupling between two pipes, at the same time enabling the operator to very conveniently perform his task, even when the coupling lies below the surface of the ground.

With the foregoing and other objects in view, the invention comprises the specific combination and arrangement of details herein shown and described to illustrate one form of the invention. However, it is to be understood that the scope of the invention extends to variations and modifications described by claims hereunto appended.

Fig. 3 is a section showing screws which are occasionally employed to forcibly release one coupling flange from the other.

Fig. 4 is an end view of a sleeve having a flange forming one of the coupling members.

Fig. 5 is a fragmentary section on the line 5—5 in Fig. 4.

Fig. 6 is a detail view of the operating ring.

Fig. 7 is a section on the line 7 in Fig. 6.

Fig. 8 is a detail view of a suitable gasket.

Fig. 9 is a detail view of an elongated, reversible closure member having an opening near the bottom which normally registers with openings in the pipe coupling, and an extended closure portion to close said openings.

Fig. 10 is a detail view showing the closure in an inverted position, and a gasket facing the closure.

Fig. 11 is a section on the line 11—11 in Fig. 10, showing gaskets at opposite sides of the reversible closure member.

Figure 2:
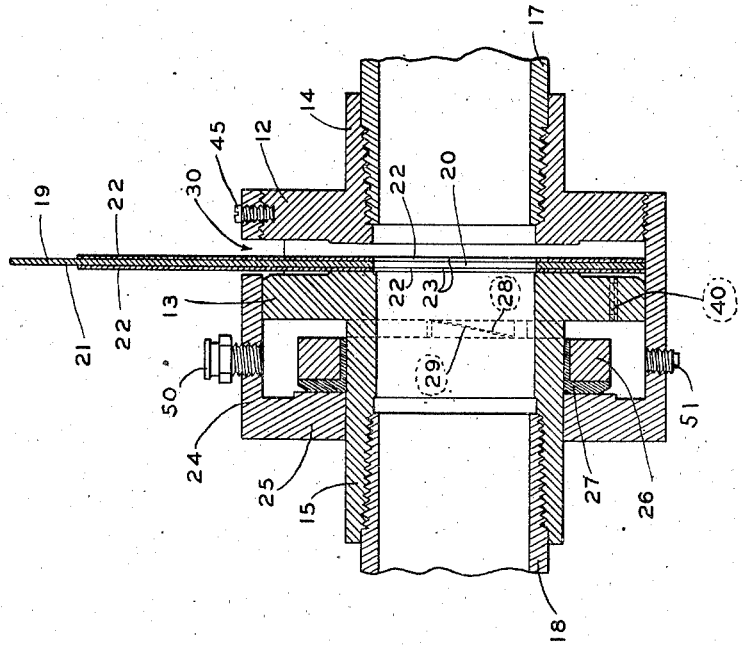
Fig. 2 is a vertical section on the line 2—2 in Fig. 1.

To illustrate one form of the invention we have shown a pipe coupling comprising abutment members 12 and 13 to be united with the ends of pipes to be coupled. These abutment members 12 and 13 may be in the form of flanges formed integral with and extending from internally threaded sleeves 14 and 15, respectively. In this form of the invention, the threaded sleeves are to be screwed onto threaded ends of pipes 17 and 18.

Any suitable closure member may be employed to open and close the space between the abutment members 12 and 13 formed by said flanges. For example, we have shown an elongated closure 19 made of sheet metal having an opening 20 which normally registers with the pipes 17 and 18, and an extended closure portion 21 remote from said opening 20. See Figures 1, 2 and 3. However, this closure 19 can be inverted, or reversed, as suggested in Fig. 10, thereby closing the space between the pipes 17 and 18.

When this closure is employed, the operator can merely release and invert the closure 19 to prevent communication between the pipes when the flanges 12 and 13 are forced toward each other.

Of course, suitable gaskets are arranged at opposite sides of the removable closure. Any desired gaskets may be employed, but an advantage may be gained by employing gaskets 22 with openings 23, removably seated at opposite sides of the closure member 19. In actual practice, the gaskets may adhere to the removable closure 19. However, each gasket 22 is provided with an extended handle 24 for convenience in removing and restoring the gaskets.

In addition to the foregoing unique details, the invention extends to novel cooperative conditions whereby one of the flanges, or abutments, 12 and 13 is forced toward the other, so as to provide for rapid opening and closing of the pipe coupling.

Bearing in mind that scope of the patent is to be determined by its claims, and not by specific details in the description, we will expedite the continued description as follows:

A housing 24, in the form of a cylinder, surrounds the flanges 12 and 13. One end of this housing is internally threaded to receive peripheral screw threads of the flange 12, as shown in Figures 2 and 3, thereby removably securing the cylindrical housing to the flange 12. The other end of the cylinder 24 has an inturned abutment 25 removably confining the flange 13 in an area between the flange 12 and the inturned abutment 25. In this specific form of the invention, an oscillatory ring 26 surrounds the sleeve 15 of the flange 13. This ring 26 is directly between the flange 13 and the inturned abutment 25. Said oscillatory ring 26 may be provided with anti-friction material 27 at its inner face where the ring is in contact with the sleeve 15, and this anti-friction material is preferably extended, as shown in Figures 2, 3 and 7 to contact with the inner face of the abutment 25.

To illustrate a suitable means for forcing one of the coupling flanges toward the other coupling flange, we have shown cams 28 extending from the flange 13 and cams 29 extending from the ring 26 in contact with the cams 28 to force the flange 13 toward the flange 12 in response to an arcuate movement of the oscillatory ring 26.

The cylinder 24 has a peripheral slot 30 (Fig. 2) in a plane between the flanges 12 and 13, and the elongated closure member 19, with its gaskets 22, is removably located in said slot 30 to provide for selective opening and closing of the pipe connection.

When the operating ring 26 is moved to tighten the gaskets 22, the pipe connection is sealed. However, a reverse movement of said ring will enable the flanges 12 and 13 to be separated from each other as shown in Fig. 2, thereby releasing the closure 19 and its gaskets 22. The closure 19 can then be removed and inverted to close the pipe connection when the operating ring 26 is moved to again tighten the pipe connection. Figure 9 shows the closure member 19 in its normal open position. Figure 10 shows said closure 19 in an inverted position wherein it prevents communication between the connected pipes.

Figure 1:
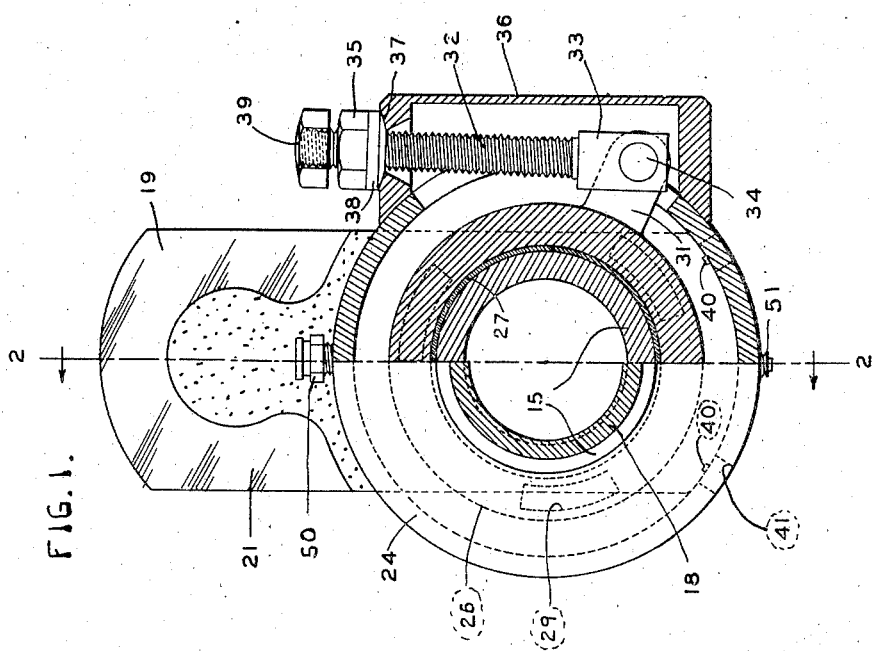
Fig. 1 is a combined sectional and elevational view showing one form of the invention.

To illustrate a suitable means for operating the ring 26, be have shown an operating arm 31 extending from said ring, an operating screw 32 having a bifurcated lower end 33 (Figures 1 and 3) embracing said operating arm 31, a detachable pivot pin 34 connecting the bifurcated end 33 to the arm 31, and an operating nut 35 near the top of said screw 32 to actuate said ring 26, as shown in Fig. 1.

The housing has an extension 36 (Figures 1 and 3) provided with an opening at the top to receive the operating screw 32 and a concave seat 37 surrounding said opening. A washer 38 is interposed between the bottom of the nut 35 and said concave seat, as shown in Fig. 1, said washer having a convex bottom face contacting with said concave seat to provide for free oscillatory movements of the screw 32.

The exposed operating nut 35 can be forcibly tightened on the operating screw 32 to provide for forcible tightening movements of the operating ring 26, thereby clamping the reversible closure member 19 and its gaskets 22 between the abutment flanges 12 and 13.

An abutment cap 39 (Fig. 1) is screwed onto the top of the operating screw 32 to receive hammer blows which may be required for downward movements of said screw in releasing the operating ring.

Other details include guide ribs 40 parallel with the axis of the cylinder 24, as shown in Figures 1 and 2. These guide ribs 40 extend into notches or grooves at the periphery of the flange 13, so as to prevent rotary motion of said flange independently of the cylinder 24, while allowing the flange 13 to slide in a direction parallel with the axis of the cylinder. Said ribs 40 may be at the inner ends of plugs 41, as shown in Fig. 1.

A very common type of pipe couplings includes a sealing gasket between a pair of flanges, and bolts or other devices to force the flanges toward each other. However, under some conditions, the release of connections which normally force the flanges toward each other will fail to release the coupling. Expansion of the pipes and other conditions may tend to very forcibly retain the coupling flanges in contact with the interposed gasket when the operator desires to separate the coupling flanges. This occurs in ordinary pipe work, and it is a source of special trouble when the object is to immediately overcome some unexpected danger by placing a closure between two connected pipes.

As a separate and distinct feature, the present invention includes a desirable means for quickly separating a pair of such flanges. A specific example appears in Fig. 3 where there are two coupling flanges 12 and 13, with gaskets 22 as sealing members between the flanges. In this specific form of the invention the flange 12 is threaded to receive screws 42 which extend through said flange. Each screw 42 has an exposed operating head 43 at its outer end and an abutment 44 at its inner end movable toward the companion flange 13 and adapted to contact with said flange 13, so as to forcibly separate said flanges. Rotary movements of the screws 42 in Fig. 3 will quickly separate the flanges, and if desired, a suitable closure can then be immediately placed between the flanges. For example, the closure 19 may be quickly inverted to the position shown in Fig. 10.

The screws 42 in Fig. 3 lie beyond opposite sides of the closure 19 and its gaskets 22, and said screws are normally withdrawn as shown in Fig. 3 to positions wherein they will not in any way interfere with the usual coupling and uncoupling operations.

Fig. 2 includes a removable set screw 45 threaded through the cylindrical housing 24 and extending into the flange 12, so as to normally anchor said flange to the housing.

The special plug 50 in Figures 1 and 2 provides for admission of lubricant, while the simple plug 51 at the bottom is removable for drainage of the used lubricant.

We claim:

1. A pipe coupling comprising a pair of sleeves having internal screw threads to receive the ends of pipes to be coupled, each threaded sleeve being provided with a peripheral flange located adjacent to and facing the flange of its companion sleeve, a housing surrounding the flanges, one end of said housing being rigidly secured to one of said flanges, the other end of said housing having an inturned abutment confining the other flange, an oscillatory operating ring surrounding the sleeve of the last mentioned flange, said ring being directly between the last mentioned flange and said inturned abutment, cam members carried by the operating ring to force said last mentioned flange toward the other flange in response to an arcuate movement of said oscillatory operating ring, said housing having a slot in a plane between said flanges, a closure member movable into and out of said slot to provide for selective opening and closing of the pipe connection; and an operating member extending from said operating ring, said operating member being exposed at the exterior of said housing.

2. A pipe coupling comprising a pair of sleeves to receive the ends of pipes to be coupled, each sleeve being provided with a peripheral flange located adjacent to and facing the flange of its companion sleeve, a housing surrounding the flanges, one end of said housing being removably secured to one of said flanges, the other end of said housing having an inturned abutment confining the other flange, an oscillatory operating ring surrounding the sleeve of the last mentioned flange, said ring being directly between the last mentioned flange and said inturned abutment, cams between said last mentioned flange and the operating ring to force said last mentioned flange toward the other flange in response to an arcuate movement of said oscillatory operating ring, said housing having a slot in a plane between said flanges, a closure member movable into and out of said slot to provide for selective opening and closing of the pipe connection, and an operating member connected to said operating ring, said operating member being exposed at the exterior of said housing.

3. A pipe coupling comprising a pair of sleeves having internal screw threads to receive the ends of pipes to be coupled, each threaded sleeve being provided with a peripheral flange located adjacent to and facing the flange of its companion sleeve, a housing surrounding the flanges, one end of said housing being removably screwed onto one of said flanges, the other end of said housing having an inturned abutment confining the other flange, an oscillatory operating ring surrounding the sleeve of the last mentioned flange, said ring being directly between the last mentioned flange and said inturned abutment, cams between said last mentioned flange and the operating ring to force said last mentioned flange toward the other flange in response to an arcuate movement of said oscillatory operating ring, said housing having a peripheral slot in a plane between said flanges, a closure member movable into and out of said slot to provide for selective opening and closing of the pipe connection, an operating screw pivotally connected to said operating ring, said housing having an opening to receive an extended end of said operating screw and a seat around said opening, and an operating nut screwed onto said extended end to forcibly tighten said oscillatory operating ring.

4. A pipe coupling comprising a pair of sleeves to receive the ends of pipes to be coupled, each sleeve being provided with a peripheral flange located adjacent to and facing the flange of its companion sleeve, one of the flanges having peripheral screw threads, a housing comprising a cylinder surrounding the flanges, one end of said cylinder being internally threaded and removably screwed onto said peripheral screw threads, the other end of said cylinder having an inturned abutment confining the other flange, an oscillatory operating ring surrounding the sleeve of the last mentioned flange, said ring being directly between the last mentioned flange and said inturned abutment, camming members extending from the operating ring to force said last mentioned flange toward the other flange in response to an arcuate movement of said oscillatory ring, said cylinder having a peripheral slot in a plane between said flanges, a closure member movable into and out of said slot to provide for selective opening and closing of the pipe connection, an operating screw pivotally connected to said operating ring, said housing having an opening to receive said operating screw, and an operating nut located on said screw at an area outside of said housing to provide for forcible tightening movements of the operating ring.

5. A pipe coupling comprising a pair of sleeves to receive the ends of pipes to be coupled, each sleeve being provided with a peripheral flange located adjacent to and facing the flange of its companion sleeve, one of the flanges having peripheral screw threads, a housing surrounding the flanges, one end of said housing being internally threaded and removably screwed onto said peripheral screw threads, the other end of said housing having an inturned abutment confining the other flange, an oscillatory operating ring surrounding the sleeve of the last mentioned flange, said ring being directly between the last mentioned flange and said inturned abutment, cams extending from said last mentioned flange and cams extending from the operating ring in contact with the cams of said flange to force said last mentioned flange toward the other flange in response to an arcuate movement of said oscillatory ring, said housing having an opening in a plane between said flanges, a closure member movable into and out of said opening to provide for selective opening and closing of the pipe connection, an operating screw pivotally connected to said operating ring, said housing also having an extension provided with an opening at the top to receive said operating screw and a seat at the top of said extension, an operating nut located on said screw at an area directly above said seat to provide for forcible tightening movements of the operating ring, the operating nut being movable to release the tightened operating ring, and means for forcibly separating said flanges, said means comprising screws carried by the peripherally threaded flange and having inner ends movable toward the companion flange, so as to forcibly separate said flanges.

6. A pipe coupling comprising a pair of sleeves to receive the ends of pipes to be coupled, each sleeve being provided with a peripheral flange located adjacent to and facing the flange of its companion sleeve, one of the flanges having peripheral screw threads, a housing comprising a cylinder surrounding the flanges, one end of said cylinder being internally threaded and removably screwed onto said peripheral screw threads, the other end of said cylinder having an inturned abutment confining the other flange, an oscillatory operating ring surrounding the sleeve of the last mentioned flange, said ring being directly between the last mentioned flange and said inturned abutment, cams extending from said last mentioned flange and cams extending from the operating ring in contact with the cams of said flange to force said last mentioned flange toward the other flange in response to an arcuate movement of said oscillatory ring, said cylinder having a peripheral slot in a plane between said flanges, a closure member movable into and out of said slot to provide for selective opening and closing of the pipe connection, an operating screw pivotally connected to said operating ring, said housing having an extension provided with an opening at the top to receive said operating screw and a seat at the top of said extension, an operating nut located on said screw at an area directly above said seat to provide for forcible tightening movements of the operating ring, said screw being provided with an abutment cap screwed onto its upper end to receive hammer blows in releasing said operating ring, said cylinder having internal guide ribs parallel with its axis, and said last mentioned flange being provided with peripheral notches to slidably receive said guide ribs, thereby preventing rotary displacement at said guide ribs, the operating nut being movable to release the tightened operating ring, and means for forcibly separating said flanges, said means comprising screws carried by the peripherally threaded flange and having inner ends movable toward the companion flange, so as to forcibly separate said flanges.

7. A pipe coupling comprising abutment flanges to be united with the ends of pipes to be coupled, a housing surrounding said abutment flanges, one of said flanges being slidable in the housing, an oscillatory cam ring confined in said housing directly between said slidable flange and a wall of the housing, said confined oscillatory cam ring having side cam members to positively force the slidable flange toward the other flange in response to an arcuate movement of said ring, said housing having a peripheral opening in a plane between said abutment flanges, a closure member movable into and out of said opening to provide a detachable seal between the abutment flanges, and operating means extending from said confined oscillatory cam ring, said operating means including an operating member exposed at the exterior of said housing.

8. A pipe coupling comprising abutment flanges to be united with the ends of pipes to be coupled, a housing surrounding said abutment flanges, one of said flanges being fixed to the housing and provided with screws to forcibly separate the flanges, the other abutment flange being slidable in the housing, an oscillatory cam ring confined in said housing directly between said slidable flange and a wall of the housing, said confined oscillatory cam ring having laterally extended side cam members to positively force the slidable flange toward the companion fixed flange in response to an arcuate movement of said ring, said housing having a peripheral opening in a plane between said abutment flanges, a closure member movable into and out of said opening to provide a detachable seal between the abutment flanges, and operating means extending from said confined oscillatory cam ring to the exterior of said housing.

EDDIE M. DONS.
JESSE V. STEVENS.

REFERENCES CITED

The following references are of record in the file of this patent:

UNITED STATES PATENTS

| Number | Name | Date |
|---|---|---|
| 2,278,848 | Hamer | Apr. 7, 1942 |
| 2,340,499 | Zachow | Feb. 1, 1944 |
| 2,386,893 | Hamer | Oct. 16, 1945 |